Patented Oct. 24, 1933

1,932,104

UNITED STATES PATENT OFFICE 1,932,104

ABRASIVE ARTICLE AND METHOD OF MAKING SAME

Sigel F. Hepp, Hamburg, N. Y.

No Drawing. Application January 15, 1932
Serial No. 586,962

11 Claims. (Cl. 51—280)

This invention relates to abrasive articles, such as are employed in grinding and polishing operations, and particularly to the type utilizing a filler, cement or binder for the abrasive particles.

Heretofore, natural rubber has not been entirely satisfactory as a cement or bonding agent for the abrasive particles, because it does not have sufficient adhesion to the particles, and is not as resistant to absorption or penetration by water and oils as desired, and control of the hardness is not easily obtained.

An object of this invention is to provide an improved abrasive article for grinding and polishing purposes, and method of making the same, which will not be open to the objections of natural rubber; which will be less expensive; which will be superior in quality to abrasive articles utilizing natural rubber as the binder or adhesive; which will have greater natural strength against distortion or fracture; and which may be more easily formed with less uncertainty, and with more uniform results.

Various other objects will appear from the following description of one example of the invention, and the manner of making the same, and the novel features will be particularly pointed out hereinafter in connection with the appended claims.

In accordance with this invention, I have discovered that synthetic rubber, also known as chloroprene, may be utilized advantageously as the binder or filler for abrasive or polishing articles, and when so utilized, a very superior abrasive article is created. I have also discovered that utilizing the synthetic rubber, instead of natural rubber, enables one to simplify greatly the process of forming the abrasive articles.

A description of synthetic rubber, otherwise known as chloroprene, is set forth in the Journal of the American Chemical Society, 53: 4197 and 4203 (1931) under publication date of November 5, 1931, and reference to those articles in that journal may be had for a more complete identification of this synthetic rubber. This synthetic rubber or chloroprene is more or less fluid when incompletely polymerized, and if the chloroprene is further polymerized its fluidity decreases and its hardness increases. When fully polymerized, it is not plastic and cannot be rolled out and handled in the manner that natural rubber may be handled, nor is it subject to deterioration by gasoline or lubricating oils.

It is frequently desirable to utilize lubricants in grinding and polishing operations, and such lubricants and polishing pastes frequently have a tendency to deteriorate the natural rubber binder heretofore used. With this synthetic rubber, known as chloroprene, as the binding agents, deterioration by the action of the agents commonly used in the grinding operation is practically avoided, and the durability and strength of such abrasive articles is increased. The polymerization or hardening of chloroprene may be very easily and accurately controlled, and may be expedited by the use of catalysts, such as oxygen, and peroxides, (including benzyl peroxide). No sulphur is required in the polymerization, the principal conditions affecting the polymerization being temperature, pressure and the presence or absence of catalysts and inhibitors.

In accordance with this invention, the abrasive material, usually in the form of loose, finely divided particles, may be mixed with an incompletely polymerized chloroprene or synthetic rubber in a semi-fluid or plastic condition, in such proportions that when thoroughly mixed the entire mass is plastic and workable. I have found that this mass may be very satisfactorily worked when it has approximately the consistency of plastic concrete. As a result of the density of this mass, there is little or no tendency for the abrasive material to separate out or settle, and consequently, the mass may be molded or formed into the desired shape, and then hardened by further polymerization of the chloroprene. The abrasive may also be incorporated into the chloroprene by milling before the chloroprene is fully hardened.

During the mixing of the more or less liquid, incompletely polymerized chloroprene, the chloroprene thoroughly wets the surfaces of all of the particles of the abrasive material, and because the chloroprene has greater penetrating and adhesive properties than natural rubber, it adheres more securely to the abrasive particles, and more rigidly and securely binds them to one another. Preferably, the abrasive material is mixed with the chloroprene before or during the earlier stages of polymerization, and other fillers or materials, such as carbon black, reinforcing fibres, and the like, may be mixed with the chloroprene and abrasive articles, at this same operation. The time between the mixing and pressing may be varied considerably, just as the degree of polymerization may be varied before the introduction of the abrasive material.

After the mass has been thoroughly mixed, it is hardened by further polymerization of the chloroprene. If the articles formed of this mass are to have a definite shape, the mixture may be pressed or formed while still plastic into the desired articles. The plastic mass may be hardened in various ways, such as by merely allowing it to stand until all of the chloroprene has polymerized, or the hardening may be expedited by the presence of the catalysts such as oxygen, or the application of heat or pressure to the mass, or by various combinations of these factors. By the use of inhibitors, the extent of polymerization may be regulated.

The material, upon hardening at the completion of polymerization, shinks somewhat, and for that reason, the articles when formed from the plastic material may be made somewhat larger than the size of the desired final article, so as to allow for such shrinkage. With the chloroprene, no sulphur is used in curing or hardening it, and while I do not definitely know, at this time, all of the factors which control the degree of hardening of the chloroprene, I believe that the pressure has a very important effect upon the degree of hardening in the ultimate product, and hence, by varying the degree of pressure, different degrees of hardness may be easily created.

Throughout the specification and claims, I have referred to abrasive materials, and abrasive articles, and it is to be understood that I do not refer merely to grinding articles, such as whetstones and grinding wheels, but by those expressions I intend to refer also to polishing or buffing materials or articles, such as are employed in polishing metal surfaces. In grinding wheels or similar articles, the synthetic rubber may be used to bind the loose, finely divided particles into a coherent, rigid mass, and it also will be understood that this synthetic rubber may be employed to unite larger parts of abrasive materials, such as thin disks which are brought together face to face with a layer of synthetic rubber interposed between them. The synthetic rubber, therefore, may be used for cementing or binding together into a rigid mass, loose particles of abrasive materials, and with or without other filling and binding materials, and also for securing previously bonded, abrasive articles to one another or to other materials.

Among the various advantages in the use of synthetic rubber over natural rubber may be mentioned the greater ease in incorporating the abrasive particles into the bonding material. For example, with natural rubber as a bonding material, the abrasive particles must be milled or worked into the natural rubber, and in doing so it is difficult to obtain a uniform and thorough distribution of the particles of abrasive material throughout this relatively dense body of natural rubber. If dispersed, natural rubber is used, the rubber is used in colloidal suspension with clay and water, and this is rather unsatisfactory to handle and harden.

With the synthetic rubber or chloroprene, the abrasive material is easily mixed with or incorporated in the body of synthetic rubber while the latter is in a liquid or semi-liquid state, so that the mass is plastic and easily mixed, worked and formed into desired shapes. The synthetic rubber has a much smaller particle size and greater penetrating power, so that it has greater adhesion to the abrasive materials, and produces a stronger and more rigid article. The synthetic rubber is more resistant to absorption or penetration by water, oils and the usual rubber solvents, than is the natural rubber, and the process of hardening is more perfectly, uniformly and accurately performed, and little or no heat and no sulphur are needed for the hardening.

From the foregoing, it will be observed that the abrasive masses and articles formed by the use of the synthetic rubber or chloroprene, are far superior to those formed by natural rubber, and the process of marking such articles is greatly simplified, and rendered less expensive by the use of this new binding and filling material.

It will be understood that various changes in the details, steps and materials, which have been herein described in order to explain the nature of the invention, may be made by those skilled in the art within the principle and scope of my invention and discovery, as expressed in the appended claims.

I claim:

1. An abrasive article formed of a mixture containing finely divided abrasive material and polymerized chloroprene.

2. An abrasive article comprising a hardened mixture containing loose, finely divided abrasive material and plastic, partially polymerized chloroprene.

3. An improved abrasive article having a binder and filler of synthetic polymerized chloroprene for the abrasive material.

4. An improved abrasive article having the abrasive components united by synthetic polymerized chloroprene.

5. The method of making abrasive articles, which comprises mixing loose, finely divided, abrasive material with plastic, incompletely polymerized chloroprene, and then increasing the polymerization of the chloroprene content until the desired hardness is obtained.

6. The method of making abrasive articles, which comprises mixing loose, finely divided, abrasive material with plastic, incompletely polymerized chloroprene, and then increasing the polymerization of the chloroprene content in the presence of a suitable catalyst until the desired hardness is obtained.

7. The method of making abrasive articles, which comprises mixing loose, finely divided, abrasive material with plastic, incompletely polymerized chloroprene, pressing the mixture into desired shapes, and then continuing polymerization of the chloroprene content until the pressed articles have hardened.

8. The method of making abrasive articles which comprises mixing loose, finely divided, abrasive material with plastic, incompletely polymerized chloroprene to provide a mass having approximately the consistency of plastic concrete, then forming the mixture into desired articles, and continuing the polymerization of the chloroprene content of such formed articles until such articles have the desired hardness.

9. The method of making abrasive articles which comprises mixing loose, finely divided, abrasive material with incompletely polymerized chloroprene, while the latter is in a fluid or semi-fluid condition, and then continuing the polymerization of the chloroprene until it has desired hardness.

10. An abrasive article comprising abrasive particles and a polymerized chloroprene formed in situ from incompletely polymerized chloroprene in a liquid state.

11. The method of making an abrasive article which comprises the steps of mixing abrasive particles with a liquid, incompletely polymerized chloroprene, and then increasing the polymerization of the chloroprene until the desired hardness of the chloroprene is obtained.

SIGEL F. HEPP.